United States Patent

[11] 3,565,088

[72] Inventors Richard T. Cornelius
Minneapolis;
Harold E. Dufresne, St. Paul, Minn.
[21] Appl. No. 678,222
[22] Filed Oct. 26, 1967
[45] Patented Feb. 23, 1971
[73] Assignee The Cornelius Company
Anoka, Minn.

[54] COMBINED SHUT-OFF VALVE AND HANDLE CONSTRUCTION
15 Claims, 3 Drawing Figs.
[52] U.S. Cl. .................................................... 137/68,
137/377, 220/94, 222/475
[51] Int. Cl. ....................................................A62c 23/10,
F16k 17/40
[50] Field of Search........................................... 137/67−
−74; 169/31; 220/89A, 85P, 44, 94; 222/396,
465, 468, 475

[56] References Cited
UNITED STATES PATENTS
| | | | |
|---|---|---|---|
| 1,287,838 | 12/1918 | Benzion........................ | 222/3 |
| Re.23,142 | 8/1949 | Allen............................ | 137/68X |
| 2,234,458 | 3/1941 | Underhill..................... | 220/85P |
| 2,536,428 | 1/1951 | Dimitri et al................. | 137/68X |
| 2,580,426 | 1/1952 | Heigis.......................... | 137/68 |

FOREIGN PATENTS
| | | | |
|---|---|---|---|
| 1,256,063 | 2/1961 | France......................... | 169/31 |
| 22,497 | 11/1905 | Great Britain................ | 169/31 |

*Primary Examiner*—William F. O'Dea
*Assistant Examiner*—Richard Gerard
*Attorney*—Hill, Sherman, Meroni, Gross and Simpson ABSTRACT: A valve assembly for a pressure vessel has a lower inlet, a lateral outlet, a lateral resilient control knob, and a resilient handle at its upper end, and an internal relief valve vented through the handle but sealed by the handle from exposure to the environment.

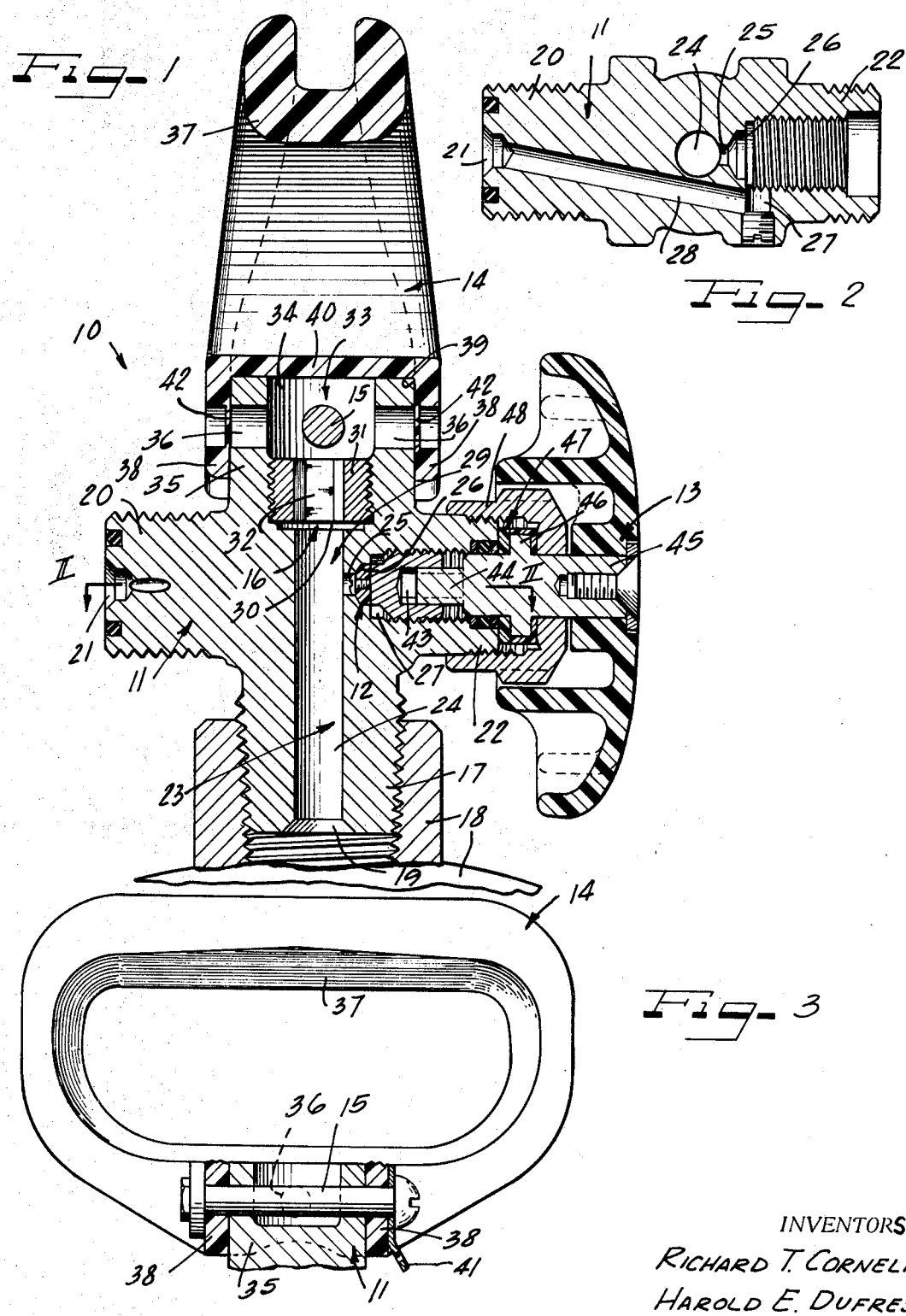

3,565,088

COMBINED SHUT-OFF VALVE AND HANDLE CONSTRUCTION

BACKGROUND OF THE INVENTION

1. Field of the Invention

This invention relates generally to a valve assembly, and more specifically to a combined shutoff valve and handle construction for use on a pressure vessel.

2. Description of the Prior Art

Portable vessels for storing gas under a high pressure are generally bottle-shaped, resting on their lower end, and having an upwardly directed opening receptive of a valve assembly. Such valve assembly includes an actuator knob and an outlet to which a pressure regulator is normally attached. During ordinary handling and shipment of such pressure vessel, the pressure regulator is absent and the valve is closed. Valves of this type have their actuator knob so mounted that its rotational axis is concentric with the valve inlet. In smaller portable vessels, such as used with carbon dioxide gas or oxygen, such actuator knob is grasped for purposes of transporting the vessel. This conventional arrangement has two disadvantages. The most serious of these is that the location of the actuator knob renders it susceptible to physical damage by virtue of its location. The second disadvantage is that the actuator knob is not particularly comfortable when used as a carrying handle, a problem that becomes aggravated as the vessel size increases.

SUMMARY OF THE INVENTION

According to our invention, a valve assembly is provided wherein the actuator knob is disposed at a lateral side of the valve body, and a resilient handle is rigidly secured to the upper end of the valve body, the handle enclosing and venting a relief valve.

Accordingly, it is an object of the present invention to provide a combined shutoff valve and handle construction for use on pressure vessels.

A further object of the present invention is to provide a valve assembly for pressure vessels wherein the actuator knob is disposed remotely from the upper end and thus at a place offering greater physical safety.

Yet another object of the present invention is to provide a valve assembly for pressure vessels by which the pressure vessels may be comfortably carried by hand.

A still further object of the present invention is to provide a valve assembly for pressure vessels which valve assembly includes a carrying handle rigidly secured to the valve body, the handle being resilient and thus resistant to any mechanical shocks imparted thereto.

Yet another object of the present invention is to provide a valve assembly for pressure vessels, such valve assembly having an internal relief valve so arranged that gas at an excessive pressure may readily escape, and may escape without impinging any hand that may be gripping the handle thereon.

Another object of this invention is to provide protection for a relief valve against tampering and against environmental factors such as corrosive substances and dirt.

Many other advantages, features and additional objects of the present invention will become manifest to those versed in the art upon making reference to the detailed description and the accompanying drawing in which a preferred structural embodiment incorporating the principles of the present invention is shown by way of illustrative example.

ON THE DRAWING

FIG. 1 is a vertical cross-sectional view through a combined shut-off valve and handle construction provided in accordance with the principles of the present invention;

FIG. 2 is a cross-sectional view of the body of the valve assembly taken generally along line II—II of FIG. 1 with parts omitted; and FIG. 3 is a side elevational view of the upper portion of FIG. 1 with parts in section and broken away.

AS SHOWN ON THE DRAWING

The principles of the present invention are particularly useful when embodied in a valve assembly such as illustrated in FIG. 1, generally indicated by the numeral 10. The valve assembly 10 is a combined shutoff valve and handle construction and to this end includes a valve body 11, a valve 12, an actuator knob 13 of resilient shock-absorbing material such as plastic, a handle 14, a handle retainer pin 15 and a relief valve 16.

The valve body 11 has a lower end 17 which is normally threaded into a cylindrical pressure vessel 18 of known type, the lower end 17 having an inlet 19 for receiving pressurized gas from the pressure vessel 18. The valve body 11 has a first lateral side 20 which is threaded to be secured to a pressure regulator (not shown), the lateral side 20 having an outlet 21. The valve body 11 has a second lateral side 22 directly opposite to the first lateral side 20, the second lateral side 22 supporting the actuator knob 13 directly opposite to the outlet 21. The valve body 11 has an internal passage generally indicated by the numeral 23 which includes a vertical portion 24 extending upwardly from the inlet 19 to a point adjacent the valve 12, a first horizontal portion 25 extending from the vertical portion 24 through a valve seat 26 which faces in a downstream direction and to a cavity 27, and a second horizontal portion 28 extending from the cavity 27 past and adjacent to the vertical portion 24 to the outlet 21. The valve body 11 has a relief passage generally indicated at 29 which begins at its upstream end as a continuation of the vertical portion 24 of the internal passage 23, such beginning being at a point upstream of the seat 26. With this arrangement, there is provided a flow path from the inlet 19 to the relief valve 16 which is a straight line.

The relief valve 16 includes a rupture disc 30 which is imperforate and which is held in sealing relation against the valve body 11 by means of a threaded apertured plug 31. The plug 31 has a noncircular aperture 32 by which the plug may be inserted and removed. The aperture 32, on rupture of the disc 30 defines a further part of the relief passage 29, the plug 32 sitting at the lower end of a bore 33, the upper end of which comprises a service opening 34 through which access may be had to the relief valve 16 for service when the handle 14 has been removed.

The valve body 11 has an upper end 35 within which the bore 33 and hence the plug 31 is disposed, such upper end 35 comprising an upwardly projecting boss. The plug aperture 32, a part of the relief passage 29, enables escaping gas to expand, and thus there is preferably provided an increase in flow area in the form of two laterally directed vents 36, 36 in the boss 35.

The handle 14 has a gripping portion 37 formed smoothly to fit the hand, as by molding from a resilient plastic, the handle 14 having such configuration and stiffeners as may be needed to give it the required rigidity or stiffness. The handle 14 includes a downwardly projecting flange 38 at its lower end which defines a pocket 39 which is receptive of the upper end or boss 35 of the valve body 11. The handle 14 includes an imperforate portion 40 overlying the bore 33 and thus disposed between the gripping portion 37 and the downstream side of the relief valve 16 and closing the service opening 34. This arrangement provides tamper resistance and physical protection to the relief valve 16 and can shield the hand against a blast of gas in the event that the relief valve 16 should open during handling of the vessel 18. The flange 38 in extending about the boss 35 with relatively little clearance forms a snug connection therebetween to keep out corrosive substances and this relationship is insured by the handle retainer pin 15 which extends through the flange 38 and the boss 35. As shown in FIG. 3, the handle retainer pin 15 may comprise a screw and nut arrangement. Escaping gas is deflected by the pin 15 to protect the handle portion 40 against a direct blast of gas.

In the event that escaping gas ruptures the handle portion 40, the handle retainer pin further serves as a deflector for shielding any hand grasping the gripping portion 37 against a blast of gas. The pin 15 may also retain a clip 41 to which an outlet cover (not shown) may be chained. The flange 38 is provided with a pair of membranelike rupture elements 42 integral therewith and disposed in alignment with the apertures 36 in the boss 35, the apertures 36 thus forming the downstream or discharge end of the relief passage 29 normally sealed against foreign matter and tampering by the rupture elements 42. Escaping gas readily breaks the rupture elements 42 and is thus vented through the handle to the atmosphere.

The handle retainer pin 15 extends adjacent to the plug 31 without blocking the aperture 32, but nevertheless serves to block removal of the relief valve 16. Yet, in the event that the threads of the plug 31 should fail, the handle retainer pin 15 will hold that part within the bore 33 and thus also retain the rupture disc 30.

Terms such as "lower", "upper", "lateral", "horizontal", and like terms of direction are used herein as terms of reference for conveniently relating one part to another, and also define the usual position of the valve assembly in use.

The valve 12 is threaded into a bore in the lateral side 22 and has a plastic valve face secured thereto for engaging the valve seat 26. The valve 12 is thus advanced toward the seat and away from the seat by being rotated. To this end, it includes a noncircular aperture 43 which receives a driving end 44 of a shaft 45 to which the actuator knob 13 is secured. The shaft 45 has a flange 46 which is supported for rotation within a seal structure generally indicated at 47, a threaded cap 48 holding the shaft 45 and the seal 47 in assembled sealing relation such that rotation of the actuator knob 13 rotates the drive end 44 of the shaft 45 without moving the shaft 45 axially and also rotating the valve 12 which moves axially by an amount determined by its external threads.

When the valve assembly 10 is assembled to a pressure vessel at 18, rotation of the actuator knob 13 retracts the valve 12, thus permitting gas to move through the inlet 19, past the seat 26 into the cavity 27 and horizontally across the valve body through the portion 28 to the outlet 21. In the event that the pressure upstream from the valve seat 26 should increase by an excessive amount, the rupture disc 30 will break, permitting gas to escape through the relief passage 29 which includes the aperture 32, the bore 33, and the apertures 36, 36, 42, 42.

The relatively large diameter of the upper end of the pressure vessel and the smaller size of the handle 14 jointly define a generally frustoconical space within which space the actuator knob 13 is disposed and protected. Thus, the pressure vessel 18 and the valve body provide a measure of protection for the shock-absorbent actuator knob 13, as does also the handle 14 which is constructed to absorb shocks, to provide ease in carrying, to preclude access to the relief valve 16, to protect the relief valve from environmental factors, and to provide a vent passage for the relief valve 16.

Although various minor modifications might be suggested by those versed in the art, it should be understood that we wish to embody within the scope of the patent warranted herein, all such embodiments as reasonably and properly come within the scope of our contribution to the art.

claim:

1. A valve assembly for a pressure vessel, comprising in combination:
    a. a valve body having an inlet at its lower end, and an outlet at one lateral side connected together by an internal passage including a valve seat, said body having a boss at its upper end and a relief passage;
    b. a valve disposed in said internal passage in a position for coaction with said valve seat;
    c. an actuator knob rotatably supported by said valve body at a second lateral side for rotation about an axis concentric with said valve seat, and having a 2-way connection with said valve to move it against and away from said seat;
    d. a relief valve normally closing said relief passage; and
    e. a handle secured to said boss, a portion of said relief passage downstream of said relief valve being in said boss and being vented to the atmosphere through said handle.

2. A valve assembly according to claim 1, in which said relief passage connects a point in said internal passage which is upstream from said seat with the atmosphere, and the flow path in said valve body from said inlet through said relief valve being a straight unobstructed line.

3. A valve assembly according to claim 1,
    a. said boss being upwardly projecting;
    b. said handle having a downwardly projecting flange at its lower end and forming a pocket receiving said boss; and
    c. a handle retainer pin extending through said flange and said boss.

4. A valve assembly according to claim 3, said relief valve communicating at its upstream side with said internal passage upstream of said valve seat.

5. A valve assembly according to claim 4, in which said relief valve communicates to the atmosphere through said projecting flange of said handle, said handle being imperforate between its gripping portion and the downstream side of said relief valve.

6. A valve assembly according to claim 1, in which said handle has a resilient configuration overlying said valve body and which is secured in a rigid manner to said boss for protecting said knob.

7. A valve assembly according to claim 1, in which said valve body has a service opening leading into said relief passage for enabling service-access to said relief valve, said handle in its secured position normally closing and service opening.

8. A valve assembly according to claim 1, in which a handle retainer pin extends through said handle and said valve body at a point adjacent to said relief valve for blocking removal of said relief valve from said valve body.

9. The combination of a cylindrical pressure vessel to which a valve assembly according to claim 1, is secured, in which said actuator knob is disposed inside of a generally frustoconical space defined by said handle and the outside diameter of said pressure vessel for being mechanically jointly protected by said handle and said pressure vessel.

10. A valve assembly according to claim 1, in which said actuator knob comprises resilient material.

11. A valve assembly according to claim 1, a service opening in said body leading into said relief passage, and said handle having a portion normally closing said service opening.

12. A valve assembly according to claim 11 in which a handle retainer pin extends through said handle and said valve body through said relief passage at the downstream end of said relief valve for deflecting escaping gas away from said portion of said handle.

13. A valve assembly according to claim 11, in which said handle has a membranelike rupture element normally sealing the discharge end of said relief passage.

14. A valve assembly according to claim 1, said handle having a membranelike rupture element normally sealing the discharge end of said relief passage.

15. A valve assembly according to claim 14, in which said membranelike rupture element is integral with said handle.

UNITED STATES PATENT OFFICE
CERTIFICATE OF CORRECTION

Patent No. 3,565,088           Dated February 23, 1971

Inventor(s) Richard T. Cornelius and Harold E. Dufresne

It is certified that error appears in the above-identified patent and that said Letters Patent are hereby corrected as shown below:

Col. 3, line 59, before "claim" insert --We--.

Col. 4, line 36, delete "and" and insert --said--.

Signed and sealed this 2nd day of November 1971.

(SEAL)
Attest:

EDWARD M. FLETCHER, JR.            ROBERT GOTTSCHALK
Attesting Officer                  Acting Commissioner of Patent